United States Patent
Tsai

(10) Patent No.: US 7,923,988 B2
(45) Date of Patent: Apr. 12, 2011

(54) TEST EQUIPMENT AND TEST SYSTEM USING THE SAME

(75) Inventor: Jui-Che Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 111 days.

(21) Appl. No.: 12/497,641

(22) Filed: Jul. 3, 2009

(65) Prior Publication Data

US 2010/0072982 A1    Mar. 25, 2010

(30) Foreign Application Priority Data

Sep. 19, 2008    (CN) .......................... 2008 2 0302193

(51) Int. Cl.
*G01R 13/00* (2006.01)
(52) U.S. Cl. .................................................. 324/140 R
(58) Field of Classification Search .................... None
See application file for complete search history.

(56) References Cited

U.S. PATENT DOCUMENTS

| | | | |
|---|---|---|---|
| 7,627,398 B1 * | 12/2009 | Bennett et al. ................ 700/286 |
| 7,761,719 B2 * | 7/2010 | Ghoshal et al. ................ 713/300 |
| 2006/0164062 A1 * | 7/2006 | Stineman et al. .......... 324/76.11 |
| 2009/0219824 A1 * | 9/2009 | Kozlowski et al. ........... 370/250 |

FOREIGN PATENT DOCUMENTS

CN    100367724 C    2/2008

* cited by examiner

*Primary Examiner* — Ha Tran T Nguyen
*Assistant Examiner* — Arleen M Vazquez
(74) *Attorney, Agent, or Firm* — Raymond J. Chew

(57) ABSTRACT

A test equipment to test power over Ethernet (PoE) function of an Ethernet device comprises a first connector, a second connector, a data signal transmission circuit, a first polarity determination circuit, a second polarity determination circuit and a notification circuit. The first connector receives and transmits data signals and power signals transmitted by the Ethernet device. The data signal transmission circuit transmits the data signals to the second connector and outputs the power signals. The first and second polarity determination circuits receive and output the power signals to the notification circuit. The notification circuit receives the power signals and consequently generates a notice to indicate the PoE function of the Ethernet device is normal.

18 Claims, 3 Drawing Sheets

TEST EQUIPMENT AND TEST SYSTEM USING THE SAME

BACKGROUND

1. Technical Field

Embodiments of the present disclosure relate to test equipments, and particularly to a test equipment for Ethernet devices.

2. Description of Related Art

A power over Ethernet (PoE) function follows an IEEE 802.3af standard and is capable of powering remote devices such as base stations and IP phones. PoE technology allows data and power signals to be transmitted synchronously over unshielded twisted pair (UTP) cables in an Ethernet network.

Accordingly, testing Ethernet devices capable of PoE requires testing both data and power signal transmissions synchronously. However, commonly used test equipments normally only test data or power signal transmission separately.

BRIEF DESCRIPTION OF THE DRAWINGS

Many aspects of the embodiments can be better understood with references to the following drawings, wherein like numerals depict like parts, and wherein.

DETAILED DESCRIPTION

Figure 1:
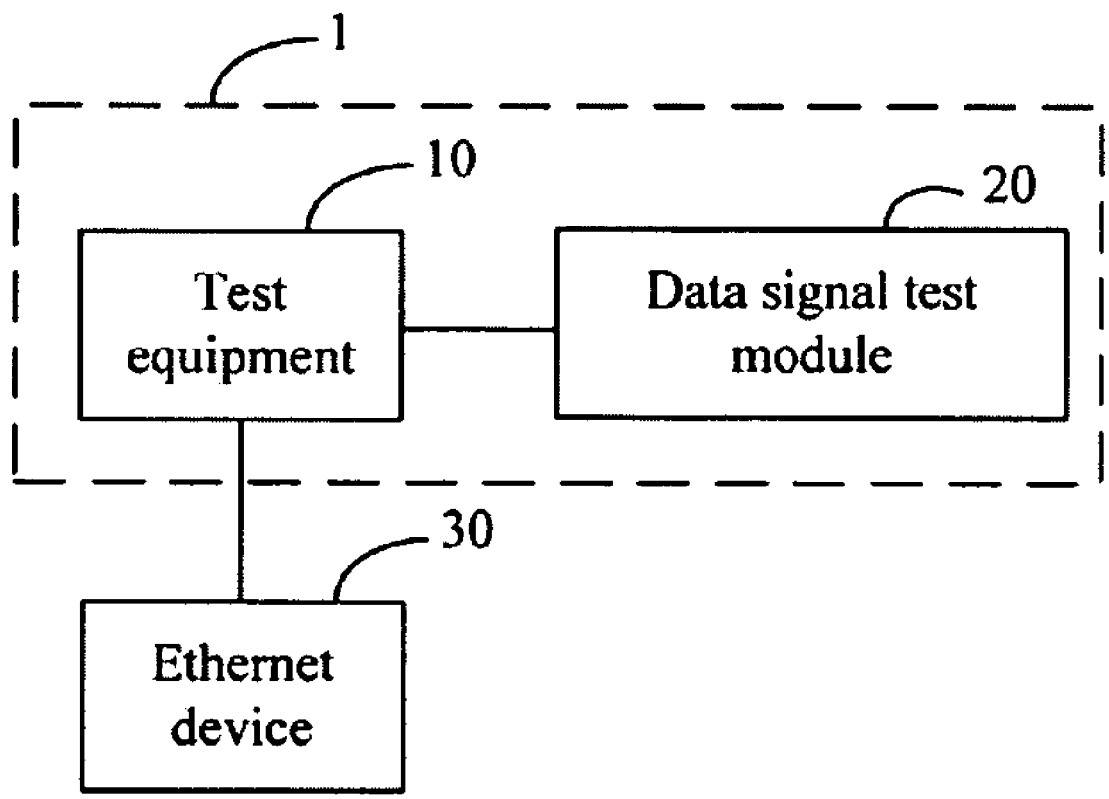
FIG. 1 is a block diagram of a test system of one embodiment of the present disclosure.

Referring to FIG. 1, a block diagram of a test system 1 of one embodiment of the present disclosure is shown. The test system 1 comprises a test equipment 10 and a data signal test module 20. The test system 1 tests data signal transmission function and power over Ethernet (PoE) function of an Ethernet device 30 simultaneously. The test equipment 10 tests the PoE function of the Ethernet device 30. The test equipment receives data and power signals transmitted by the Ethernet device 30, and transmits the data signals to the data signal test module 20. The data signal test module 20 tests the data signal transmission function of the Ethernet device 30. In one embodiment, the data signal test module 20 comprises a computer. The computer may compare the data signals transmitted by the Ethernet device 30 with reference data signals received in a preset time, to determine whether the data signal transmission function of the Ethernet device 30 is normal. In other alternative embodiments of the present disclosure, the data signal test module 20 may comprise other programs or circuits having similar functions to the computer.

Figure 2:
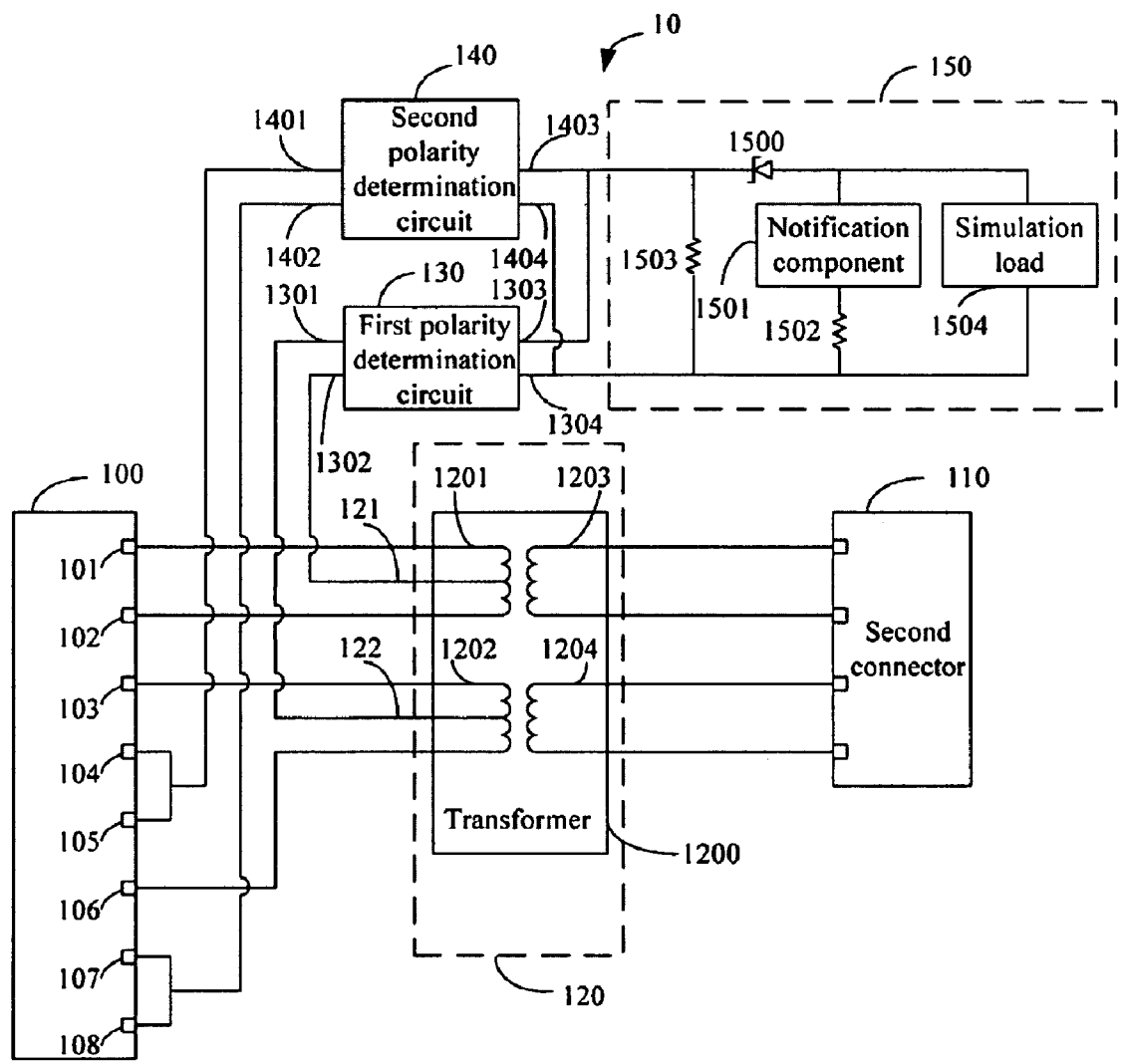
FIG. 2 is a detailed circuit of one embodiment of the test equipment of FIG. 1.

Referring to FIG. 2, a detailed circuit of one embodiment of the test equipment 10 of FIG. 1 is shown. In one embodiment, the test equipment 10 comprises a first connector 100, a second connector 110, a data signal transmission circuit 120, a first polarity determination circuit 130, a second polarity determination 140, and a notification circuit 150.

The first connector 100 receives the data and power signals from the Ethernet device 30, and comprises a first group of pins and a second group of pins. The first group of pins transmits the data signals and the power signals. The second group of pins transmits the power signals. It should be noted that the first group of pins and the second group of pins cannot transmit the power signals synchronously. The second group of pins comprises two positive power pins and two negative power pins. In one embodiment, the first connector 100 comprises a RJ-45 connector comprising eight pins from 101 to 108. The first group of pins comprises the pins 101, 102, 103 and 106 of the RJ-45 connector, and the second group of pins comprises pins 104, 105, 107 and 108 of the RJ-45 connector. Here, the pins 104 and 105 are configured as the two positive power pins, and the pins 107 and 108 are configured as the two negative power pins. The second connector 110 connected to the data signal test module 20 also comprises a RJ-45 connector correspondingly.

The data signal transmission circuit 120 is connected between the first group of pins 101, 102, 103 and 106 of the first connector 100 and the second connector 110, and transmits the data signals to the data signal test module 20 via the second connector 110, and outputs the power signals to the first polarity determination circuit 130 when the first group of pins 101, 102, 103 and 106 of the first connector 100 transmits the power signals along with the data signals.

In one embodiment, the data signal transmission circuit 120 comprises a transformer 1200 to transmit the data signals received from the first group of pins 101, 102, 103 and 106 of the first connector 100 to the second connector 110 in parallel. The transformer 1200 comprises two primary windings 1201 and 1202 and two secondary windings 1203 and 1204. The primary windings 1201 and 1202 are connected to the first group of pins 101, 102, 103 and 106 of the first connector 100, and comprise central taps 121 and 122 configured to output the power signals. The secondary windings 1203 and 1204 are connected to the second connected 110. In one embodiment, each of the primary windings 1201, 1202 and the secondary windings 1203, 1204 comprises two ends. The primary winding 1201 is connected to the pins 101 and 102 of the first connector 100, and the primary winding 1202 is connected to the pins 103 and 106 of the first connector 100. The secondary winding 1203 is connected to a first pin and a second pin of the second connector 110, and the secondary winding 1204 is connected to a third pin and a fourth pin of the second connector 110.

The first polarity determination circuit 130 receives and outputs the power signals to the notification circuit 150 when the power signals are transmitted by the data signal transmission circuit 1200. The first polarity determination circuit 130 comprises two inputs 1301 and 1302, a positive output 1303 and a negative output 1304. The two inputs 1301 and 1302 are connected to the central taps of the primary windings 1201 and 1202 of the transformer 1200 of the data signal transmission circuit 120. In one embodiment, the input 1301 is connected to the central tap 122 of the primary winding 1202 of the transformer 1200 of the data signal transmission circuit 120, and the input 1302 is connected to the central tap 121 of the primary winding 1201 of the transformer 1200 of the data signal transmission circuit 120. In another embodiment, the input 1301 is connected to the central tap 121 of the primary winding 1201 of the transformer 1200 of the data signal transmission circuit 120, and the input 1302 is connected to the central tap 122 of the primary winding 1202 of the transformer 1200 of the data signal transmission circuit 120. The positive output 1303 is configured to output positive signals of the power signals, and the negative output 1304 is configured to output negative signals of the power signals.

The second polarity determination circuit 140 receives and outputs the power signals to the notification circuit 150 the power signals when the power signals are transmitted by the second group of pins 104, 105, 107 and 108 of the first connector 100. The second polarity determination circuit 140 comprises two inputs 1401 and 1402, a positive output 1403 and a negative output 1404. One of the inputs 1401 and 1402 is connected to two positive power pins 104 and 105 of the first connector 100, and the other one of the inputs 1401 and 1402 is connected to two negative power pins 107 and 108 the first connector 100. The positive output 1403 is configured to output the positive signals of the power signals, and the negative output 1404 is configured to output the negative signals of the power signals. The positive output 1403 of the second polarity determination circuit 140 is connected to the positive output 1303 of the first polarity determination circuit 130, and the negative output 1404 of the second polarity determination circuit 140 is connected to the negative output 1304 of the first polarity determination circuit 130.

Figure 3:
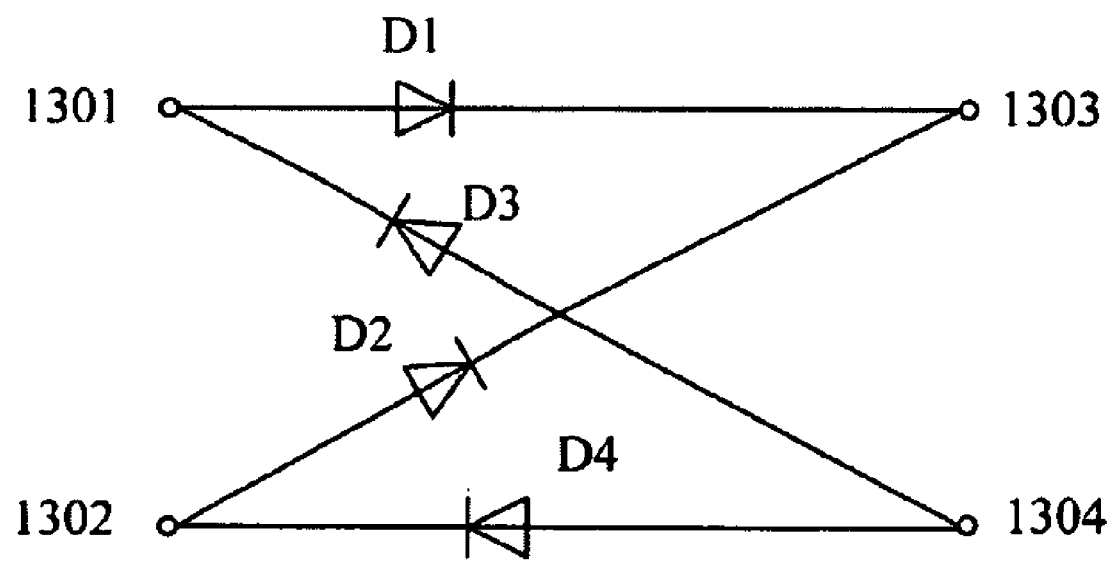
FIG. 3 is a circuit diagram of one embodiment of first polarity determination circuit of FIG. 1.

Referring to FIG. 3, a circuit diagram of one embodiment of the first polarity determination circuit 130 of the present disclosure is shown. The first polarity determination circuit 130 comprises diodes D1, D2, D3 and D4. An anode of the first diode D1 is connected to the input 1301, and a cathode of the diode D1 is connected to the positive output 1303. An anode of the diode D2 is connected to the input 1302, and a cathode of the diode D2 is connected to the positive output 1303. An anode of the diode D3 is connected to the input 1301, and a cathode of the diode D3 is connected to the negative output 1304. An anode of the diode D4 is connected to the input 1302, and a cathode of the diode D4 is connected of the negative output 1304. In one embodiment, configuration of the second polarity determination circuit 140 is substantially the same as that of the first polarity determination circuit 130, and so is omitted from this description. In other embodiments, the first polarity determination circuit 130 and the second polarity determination circuit 140 can be other circuits operable to transmit the power signals to the notification circuit 150.

When the notification circuit 150 receives the first positive and negative signals or the second positive and negative signals, the notification circuit 150 will generate a notice, such as a light or a voice, indicating the PoE function of the Ethernet device is normal. If the PoE function of the Ethernet device 30 is abnormal, the power signals will not be transmitted to the notification circuit 150, and there is no notice. In one embodiment, the notification circuit 150 comprises a zener diode 1500, a notification component 1501 and a first resistor 1502. The notification component 1501 is operable to generate the notice. The zener diode 1500 is configured to stabilize voltage of the notification component 1501. The zener diode comprises a cathode connected to the positive outputs of the first and second polarity determination circuits to receive the first or second positive signals, and an anode connected to the negative outputs of the first and second polarity determination circuits via the notification component 1501 and the first resistor 1502 to receive the first or second negative signals. The first resistor 1502 limits current flowing through the notification component 1501 to protect the notification component 1501 from over current. When the first positive and negative signals or the second positive and negative signals go through the notification component 1501, the notification component 1501 generates the notice. In one embodiment, stabilized voltage of the zener diode 1500 may be about 18V. The notification component 1501 is a light emitting diode, and the first resistor 1502 may be about 2.4KΩ. In other alternative embodiments, other light or sound components can be employed as the notification component 1501, the stabilized voltage of the zener diode 1500 and the resistance of the resistor 1502 can be modified to meet practical requirements.

In one embodiment, the notification 150 further comprises a second resistor 1503 and a simulation load 1504. The second resistor 1503 may be about 21.75KΩ according to a PoE standard, and is connected between the positive output 1403 of the second polarity determination circuit 140 and the negative output 1404 of the second polarity determination circuit 140. The simulation load 1504 is connected in parallel with the second resistor 1503 and simulates a power consumptive device whose resistance may be about 200Ω and dissipation power may be about 10 W.

If the power signals are transmitted to the data signal transmission circuit 120 along with the data signals via the first group of pins 101, 102, 103 and 106 of the first connector 100, the data signal transmission circuit 120 will receive the power and data signals synchronously. The data signals are transmitted to the second connector 110 via the secondary windings 1203 and 1204 of the transformer 1200 of the data signal transmission circuit 120. And the power signals are transmitted to the first polarity circuit 130 via the central taps 121 and 122 of the primary windings 1201 and 1202 of the transformer 1200 of the data signal transmission circuit 120.

Otherwise, the power signals are transmitted to the second polarity determination circuit 140 via the second group of pins 104, 105, 107 and 108 of the first connector 100.

The first polarity determination circuit 130 or the second polarity determination circuit 140 transmits receives the power signals transmitted via the first group of pins 101, 102, 103 and 106 or the second group of pins 104, 105, 107 and 108 of the first connector 100, and transmits the power signals to the notification circuit 150 correspondingly. In one embodiment, when the notification circuit 150 receives the power signals, voltage added on the cathode of the zener diode 1500 may be about 48V. Thus, voltage added on the notification component 1501 and the first resistor 1502 may be about 30V because the stabilized voltage of the zener diode 1500 is 18V, and current flowing through the notification component 1501 is 12.5 mA. Therefore, the notification component 1501 generates a notice to indicate the PoE of the Ethernet device 30 is normal.

It is apparent that the present disclosure provides a test system operable to test the PoE function and the data transmission function of Ethernet devices synchronously.

It is believed that the present embodiments and their advantages will be understood from the foregoing description, and it will be apparent that various modifications, alternations and changes may be made thereto without departing from the spirit and scope of the present disclosure, the examples hereinbefore described merely being preferred or exemplary embodiments of the present disclosure.

What is claimed is:

1. A test equipment to test power over Ethernet (PoE) function of an Ethernet device, the test equipment comprising:
    a first connector to receive data signals and power signals transmitted by the Ethernet device, the first connector comprising:
        a first group of pins to transmit the data signals and the power signals;
        a second group of pins comprising two positive power pins and two negative power pins to transmit the power signals;
    a second connector;
    a data signal transmission circuit connected between the first group of pins of the first connector and the second connector to transmit the data signals to the second connector, and to transmit the power signals;
    a first polarity determination circuit configured to receive and output the power signals when the power signals are transmitted by the data signal transmission circuit;

a second polarity determination circuit configured to receive and output the power signals when the power signals are transmitted by the second group of pins of the first connector; and a notification circuit configured to generate a notice to indicate the PoE function of the Ethernet device is normal when receiving the power signals output by the first or second polarity determination circuit.

2. The test equipment as claimed in claim 1, wherein the first connector comprises a RJ-45 connector, wherein the first group of pins of the first connector comprises the first, second, third and sixth ports of the RJ-45 connector.

3. The test equipment as claimed in claim 1, wherein the data signal transmission circuit comprises a transformer comprising two primary windings and two secondary windings, wherein the two primary windings of the transformer are connected to the first group of pins of the first connector, and each comprises a central tap configured to output the power signals, and the two secondary windings are connected to the second connector.

4. The test equipment as claimed in claim 3, wherein the first polarity determination circuit comprises:
   two inputs connected to the central taps of the two primary windings of the transformer, respectively;
   a positive output configured to output positive signals of the power signals; and
   a negative output configured to output negative signals of the power signals.

5. The test equipment as claimed in claim 4, wherein the first polarity determination circuit comprises:
   a first diode with an anode connected to one of the two inputs of the first polarity determination circuit, and a cathode connected to the positive output of the first polarity determination circuit;
   a second diode with an anode connected to the other one of the two inputs of the first polarity determination circuit, and a cathode connected to the positive output of the first polarity determination circuit;
   a third diode with an anode connected to the negative output of the first polarity determination circuit, and a cathode connected to the one of the two inputs of the first polarity determination circuit;
   a fourth diode with an anode connected to the negative output of the first polarity determination circuit, and a cathode connected to the other one of the two inputs of the first polarity determination circuit.

6. The test equipment as claimed in claim 4, wherein the second polarity determination circuit comprises:
   a first input connected to the two positive power pins;
   a second input connected to the two negative power pins;
   a positive output configured to output the positive signals of the power signals; and
   a negative output configured to output the negative signals of the power signals.

7. The test equipment as claimed in claim 6, wherein the second polarity determination circuit comprises:
   a fifth diode with an anode connected to the first input of the second polarity determination circuit, and a cathode connected to the positive output of the second polarity determination circuit;
   a sixth diode with an anode connected to the second input of the second polarity determination circuit, and a cathode connected to the positive output of the second polarity determination circuit;
   a seventh diode with an anode connected to the negative output of the second polarity determination circuit, and a cathode connected to the first input of the second polarity determination circuit;
   an eight diode with an anode connected to the negative output of the second polarity determination circuit, and a cathode connected to the second input of the second polarity determination circuit.

8. The test equipment as claimed in claim 6, wherein the notification circuit comprises:
   a notification component operable to generate the notice;
   a zener diode with a cathode connected to the positive outputs of the first and second polarity determination circuits to receive the positive signals of the power signals, and an anode connected to the negative output of the first and second polarity determination circuits via the notification component to receive the negative signals of the power signals;
   wherein when the power signals go through the notification component for the notification component to generates the notice.

9. The test equipment as claimed in claim 8, wherein the notification circuit further comprises a simulation load connected in parallel with the notification component in parallel to receive the power signals.

10. A test system to test the power over Ethernet function and the data signal transmission function of the Ethernet device, comprising:
   a test equipment to test power over Ethernet function of a Ethernet device, comprising:
     a first connector to receive data signals and power signals transmitted by the Ethernet devices, the first connector comprising:
       a first group of pins to transmit the data signals and the power signals;
       a second group of pins comprising two positive power pins and two negative power pins to transmit the power signals;
     a second connector;
     a data signal transmission circuit connected between the first group of pins of the first connector and the second connector, to transmit the data signals to the second connector, and to transmit the power signals;
     a first polarity determination circuit configured to receive and output the power signals when the power signals are transmitted by the data signal transmission circuit;
     a second polarity determination circuit configured to receive and output the power signals when the power signals are transmitted by the second group of pins of the first connector; and
     a notification circuit configured to generate a notice to indicate the PoE function of the Ethernet device is normal when receiving the power signals output by the first or second polarity determination circuit; and
   a data signal test module to compare the data signals received from the second connector of the test equipment with reference data signals received in a preset time to determine whether the data signal transmission function of the device is normal.

11. The test system as claimed in claim 10, wherein the first connector comprises a RJ-45 connector, wherein the first group of pins of the first connector comprises the first, second, third and sixth ports of the RJ-45 connector.

12. The test system as claimed in claim 11, wherein the data signal transmission circuit comprises a transformer comprising two primary windings and two secondary windings, the two primary windings of the transformer are connected to the first group of pins of the first connector, and each comprises a central tap configured to output the power signals, and the two secondary windings are connected to the second connector.

13. The test system as claimed in claim 12, wherein the first polarity determination circuit comprises:
 two inputs connected to the central taps of the primary windings of the transformer, respectively;
 a positive output configured to output positive signals of the power signals; and
 a negative output configured to output negative signals of the power signals.

14. The test system as claimed in claim 13, wherein the first polarity determination circuit comprises:
 a first diode with an anode connected to one of the two inputs of the first polarity determination circuit, and a cathode connected to the positive output of the first polarity determination circuit;
 a second diode with an anode connected to the other one of the two inputs of the first polarity determination circuit, and a cathode connected to the positive output of the first polarity determination circuit;
 a third diode with an anode connected to the negative output of the first polarity determination circuit, and a cathode connected to the one of the two inputs of the first polarity determination circuit;
 a fourth diode with an anode connected to the negative output of the first polarity determination circuit, and a cathode connected to the other one of the two inputs of the first polarity determination circuit.

15. The test system as claimed in claim 13, wherein the second polarity determination circuit comprises:
 a first input connected to the two positive power pins;
 a second input connected to the two negative power pins;
 a positive output configured to output the positive signals of the power signals; and
 a negative output configured to output the negative signals of the power signals.

16. The test system as claimed in claim 15, wherein the second polarity determination circuit comprises:
 a fifth diode with an anode connected to the first input of the second polarity determination circuit, and a cathode connected to the positive output of the second polarity determination circuit;
 a sixth diode with an anode connected to the second input of the second polarity determination circuit, and a cathode connected to the positive output of the second polarity determination circuit;
 a seventh diode with an anode connected to the negative output of the second polarity determination circuit, and a cathode connected to the first input of the second polarity determination circuit;
 an eighth diode with an anode connected to the negative output of the second polarity determination circuit, and a cathode connected to the second input of the second polarity determination circuit.

17. The test system as claimed in claim 15, wherein the notification circuit comprises:
 a notification component operable to generate the notice;
 a zener diode with a cathode connected to the positive outputs of the first and second polarity determination circuits to receive the positive signals of the power signals, and an anode connected to the negative output of the first and second polarity determination circuits via the notification component to receive the negative signals of the power signals;
 wherein when the power signals go through the notification component for the notification component to generates the notice.

18. The test system as claimed in claim 17, wherein the notification circuit further comprises a simulation load connected in parallel with the notification component in parallel to receive the power signals.

* * * * *